United States Patent Office 3,202,355
Patented Aug. 24, 1965

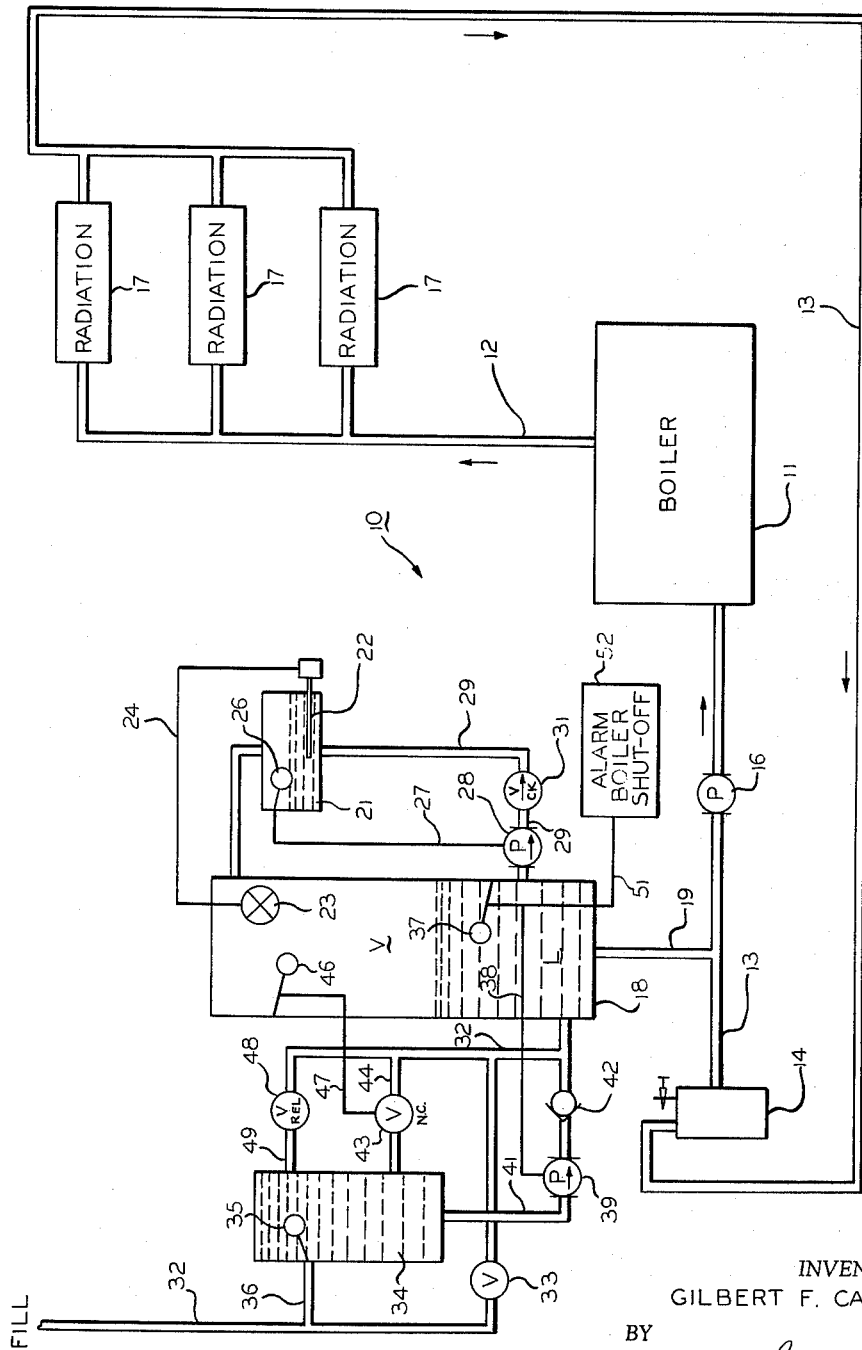

3,202,355
HOT WATER HEATING SYSTEM HAVING AUXILIARY PRESSURIZING MEANS
Gilbert F. Carlson, Skokie, Ill., assignor, by mesne assignments, to International Telephone and Telegraph Corporation, New York, N.Y., a corporation of Maryland
Filed Dec. 28, 1962, Ser. No. 247,891
5 Claims. (Cl. 237—8)

This invention relates to improvements in hot water heating systems, and more particularly to systems having an auxiliary pressurized vessel for releasing to and receiving quantities of water from the system made necessary by changes in volume of the water in the system.

Pressurized hot water heating systems present an advantage over vapor systems operating at small gauge pressure in that the heating medium can be maintained at temperatures greatly in excess of 212° F. However, by reason of the expansion in the water in the system, structure must be provided for valving off excess water, and upon cooling of the system and contraction of the water, air is introduced into the system with its consequent corrosive effect.

Heretofore, insert gases such as nitrogen have been proposed as a pressurizing medium, but its use requires pressure storage vessels, and the change in liquid volume as above described requires extensive valving mechanism.

With the foregoing considerations in mind, one of the principal objects of this invention is to provide a pressurized hot water system characterized by an auxiliary pressurized vessel adapted to receive expanded water from the system, or to return water to the system upon cooling thereof, said auxiliary vessel being pressurized by a small boiler receiving boiler water from the auxiliary vessel.

Another object is to provide a pressurized hot water system having an auxiliary pressurizing and storage vessel for a supply of system water, which varies in amount according to the expansion of the water in the system, and characterized by structure for introducing additional supply water when the volume in the system falls below a desired value and for valving off excess water from the auxiliary vessel when the system water expands beyond a predetermined amount.

Still another object is to provide an auxiliary storage vessel containing a quiescent volume of heating liquid adapted to change in amount according to the expansion or contraction of heating liquid in the system, and characterized by means adapted to receive heating liquid from the auxiliary vessel and vaporize the liquid under pressure to pressurize the vessel and the system.

Other objects and important features of the invention will be apparent from a study of the following specification taken with the drawing, which together describe and illustrate a preferred embodiment of the invention, and what is now considered to be the best mode of practicing the principles thereof. Other embodiments may be suggested to those having the benefit of the teachings herein and such other embodiments are intended to be reserved especially as they fall within the scope and spirit of the subjoined claims.

In the drawing, the single figure illustrates a closed pressurized hot water heating system having the improvements according to the present invention embodied therein.

Referring now to the drawing, the improved hot water heating system embodying the improvements according to the present invention is referred to by the reference numeral 10, and includes a boiler 11 connected in a pressurized hot water heating system embodying a supply line 12 and a return line 13. An air separator 14 is connected in the return line 13, and a pump 16 provides for circulation of heated liquid through the supply and return lines 12 and 13.

Apparatus for supplying heat for the boiler 11 is not shown, and the control of such apparatus may be by thermostats or other devices located in areas it is desired to heat. Details of such structure form no part of the present invention, and accordingly are not shown herein.

Irrespective of the manner of control of the boiler 11, the areas to be heated comprise heat radiation elements 17 which may be located in separate areas, these heat radiation elements 17 being connected across the supply and return lines 12 and 13.

Structure is provided for accommodating the change in volume of heating liquid as the same is heated, such structure including an auxiliary pressurizing vessel 18 connected by a line 19 to the return line 13 adjacent the intake or suction side of the circulating pump 16. The auxiliary vessel 18 is adapted to retain a quiescent body of liquid L which varies in volume according to the heat applied to the boiler 11 and to the circuit comprising the supply and return lines 12 and 13 and the radiation elements 17.

Structure is provided for applying pressure to a volume V above the liquid L within the auxiliary pressurizing vessel 18, and includes a small auxiliary boiler 21 which is heated by a heating element 22. Heating element 22 is energized from any convenient source, and is under the control of a pressure sensing device 23 connected by a line 24 back to the heating element 22 for the control thereof.

The level of liquid within the boiler 21 is under the control of a float actuated switch 26 connected in a line 27 to control the operation of a pump 28 connected in a line 29 connecting the auxiliary tank 18 and the boiler 21. A check valve 31 prevents the flow of liquid from the boiler 21 back to the auxiliary vessel 18. Line 29 is connected to vessel 18 near the bottom thereof, so that it is never open to the volume V within vessel 18.

The vessel 18 is adapted to be filled from a water supply, not shown, but connected thereto by a supply line 32. A fill valve 33 is connected in the supply line 32, and the line 32 is connected to the lower end of the auxiliary vessel 18 for the filling thereof as well as the heating system previously described.

A fill tank 34 is connected by a supply line 36 branching from the fill line 32, and the liquid level within fill tank 34 is controlled by a float operated valve 35.

The level of liquid within the auxiliary pressurizing vessel 18 is controlled by a lower float operated switch 37 connected in a power lead 38 to a motor operated pump 39 located in a supply line 41 between the fill tank 34 and auxiliary pressurizing vessel 18. A check valve 42 is connected in the line 41 between the output of the pump 39 and the tank 18 to prevent flow in reverse direction. Float operated switch 37 is adapted to control the energization of the motor operated pump 39 when the level of liquid in the auxiliary vessel 18 falls to a certain level.

A normally closed motor operated return valve 43 is connected in a pipe 44 between the fill tank 34 and the line 32 connected to the lower end of the auxiliary vessel 18. Return valve 43 is under the control of an upper float operated switch 46 connected by a control lead 47 to the motor operated valve 43. Thus, when the level of the liquid in the auxiliary tank 18 rises above a predetermined level, the excess of liquid is returned at the valve 43, such excess of liquid moving from the auxiliary vessel 18 by the line 32 to the line 44 and thence through valve 43 to the fill tank 34.

Pressure within the auxiliary vessel 18 is relieved by a relief valve 48 connected in a pipe 49 leading from the fill tank 34 and to the line 32. Any excess of pressure of the liquid within the auxiliary vessel 18 is thus relieved by the relief valve 48.

Safety means are provided for insuring the shut-off of the boiler 11 should the lower level in the tank 18 be maintained beyond a predetermined time. The float operated switch 37 controlling the admission of new liquid from the fill tank 34 to the auxiliary vessel 18 is accordingly connected with a control lead 51 which in turn is connected to an alarm and boiler shut-off mechanism 52. This mechanism is arranged to cut-off the supply of heat to the boiler 11 and to give at the same time an alarm to the operator that the level of liquid within the auxiliary tank 18 is at too low a level. However, since the float operated switch 37 is called upon from time to time to control the admission of liquid from the fill tank 34 to the auxiliary vessel 18, the operation of the alarm and shut-off 52 does not immediately occur, a suitable delaying mechanism being incorporated in the shut-off mechanism 52 in a manner well known in the art.

The operation of the apparatus seen in the drawing is believed clear from the description thus far. However, assuming the system 10 has been filled from the supply line 32 to a level determined by the float operated switch 37, the application of heat to boiler 11 will cause the water of the system to expand to rise within auxiliary vessel 18. All during this time, pressure is maintained on the system by boiler 21, the pressure value being controlled by pressure sensing device 23 which determines the application of heat to boiler 21.

As the temperature within the heating system 10 varies, the volume of liquid within the system varies, this variation in volume being accommodated by auxiliary vessel 18, all the while proper pressure being maintained on the system.

It may be noted that the accommodation for change in volume of heating liquid is accomplished without the need of adding fresh water. Since the oxygen dissolved within the initial charge of water soon combines with the metal of the system, and since additional fresh water need be added to the system but infrequently, minimum corrosion to the system results.

It will be observed also, that the liquid within the auxiliary vessel 18 is normally quiescent, and that the circulating heating liquid does not flow therethrough, as has been the case with certain systems known in the prior art. By employing a quiescent auxiliary pressurizing vessel nice control of pressure and addition of additional water to the system may be had.

While the invention has been described in terms of a preferred embodiment thereof, its scope is intended to be limited only by the claims here appended.

I claim:

1. In a closed hot liquid heating system having a boiler and heat radiation means connected between the supply and return lines to said boiler, including means for circulating liquid through said heat radiation means, an auxiliary pressurizing vessel connected to said system and adapted to receive a quiescent quantity of heating liquid which changes in amount according to the expansion or contraction of heating liquid in the system, the improvement in said system which comprises an auxiliary boiler including a supply connection between said auxiliary boiler and said auxiliary vessel for heating liquid, said auxiliary boiler being much smaller than said auxiliary pressurizing vessel, a vapor connection between said auxiliary boiler and the vapor space in said auxiliary vessel above the level of liquid contained therein, means for applying heat to said auxiliary boiler including means responsive to the pressure in said auxiliary vessel for regulating said heat applying means, a pump in said supply connection between said auxiliary boiler and said auxiliary vessel, and means responsive to the quantity of liquid in said auxiliary boiler for controlling the operation of said last named pump.

2. In a closed hot liquid heating system having a boiler and heat radiation means connected between the supply and return lines to said boiler, including means for circulating liquid through said heat radiation means, an auxiliary pressurizing vessel connected to said system and adapted to receive a quiescent quantity of heating liquid which changes in amount according to the expansion or contraction of heating liquid in the system, the improvement in said system which comprises an auxiliary boiler including a supply connection between said auxiliary boiler and said auxiliary vessel for heating liquid, said auxiliary boiler being much smaller than said auxiliary pressurizing vessel, a vapor connection between said auxiliary boiler and the vapor space in said auxiliary vessel above the level of liquid contained therein, means for applying heat to said auxiliary boiler including means responsive to the pressure in said auxiliary vessel for regulating said heat applying means, a pump in said supply connection between said auxiliary boiler and said auxiliary vessel, means responsive to the quantity of liquid in said auxiliary boiler for controlling the operation of said last named pump, and means for preventing the flow of liquid from said auxiliary boiler to said auxiliary vessel.

3. In a closed hot liquid heating system having a boiler and heat radiation means connected between the supply and return lines to said boiler, including means for circulating liquid through said heat radiation means, an auxiliary pressurizing vessel connected to said system and adapted to receive a quiescent quantity of heating liquid which changes in amount according to the expansion or contraction of heating liquid in the system, the improvement in said system which comprises an auxiliary boiler including a supply connection between said auxiliary boiler and said auxiliary vessel for heating liquid, said auxiliary boiler being much smaller than said auxiliary pressurizing vessel, a vapor connection between said auxiliary boiler and the vapor space in said auxiliary vessel above the level of liquid contained therein, means for applying heat to said auxiliary boiler including means responsive to the pressure of said auxiliary vessel for regulating said heat applying means, a pump in said supply connection between said auxiliary boiler and said auxiliary vessel, means responsive to the quantity of liquid in said auxiliary boiler for controlling the operation of said pump, means for controlling the upper and lower levels of liquid within said auxiliary vessel, and signal means actuatable when the level of liquid within said auxiliary vessel is lower than a predetermined level for longer than a predetermined time.

4. In a closed hot liquid heating system having a boiler and heat radiation means connected between the supply and return lines to said boiler, including means for circulating liquid through said heat radiation means, an auxiliary pressurizing vessel connected to said system and adapted to receive a quiescent quantity of heating liquid which changes in amount according to the expansion or contraction of heating liquid in the system, the improvement in said system which comprises an auxiliary boiler including a supply connection between said auxiliary boiler and said auxiliary vessel for heating liquid, said auxiliary boiler being much smaller than said auxiliary pressurizing vessel, a vapor connection between said auxiliary boiler and the vapor space in said auxiliary vessel above the level of liquid contained therein, means for applying heat to said auxiliary boiler including means responsive to the pressure of said auxiliary vessel for regulating said heat applying means, a pump in said supply connection between said auxiliary boiler and said auxiliary vessel, means responsive to the quantity of liquid in said auxiliary boiler for controlling the operation of said pump, and means for introducing additional liquid to said auxiliary vessel when the level therein falls below a predetermined value, and for relieving liquid therefrom when the level therein reaches a predetermined upper level.

5. In a closed hot liquid heating system having a boiler and heat radiation means connected between the supply and return lines to said boiler, including means for circulating liquid through said heat radiation means, an auxiliary pressurizing vessel connected to said system and adapted to receive a quiescent quantity of heating liquid which changes in amount according to the expansion or contraction of heating liquid in the system, the improvement in said system which comprises an auxiliary boiler including a supply connection between said auxiliary boiler and said auxiliary vessel for heating liquid, said auxiliary boiler being much smaller than said auxiliary pressurizing vessel, a vapor connection between said auxiliary boiler and said vapor space in said auxiliary vessel above the level of liquid contained therein, means for applying heat to said auxiliary boiler including means responsive to the pressure in said auxiliary vessel for regulating said heat applying means, a pump in said supply connection between said auxiliary boiler and said auxiliary vessel, means responsive to the quantity of liquid in said auxiliary boiler for controlling the operation of said pump, and means for relieving pressure in said auxiliary vessel above a predetermined amount.

References Cited by the Examiner

UNITED STATES PATENTS

| | | | |
|---|---|---|---|
| 1,294,517 | 2/19 | Motley | 237—61 |
| 3,095,012 | 6/63 | McShane | 138—30 |
| 3,134,543 | 5/64 | Carlson et al. | 237—63 |

FOREIGN PATENTS

| | | |
|---|---|---|
| 592,656 | 2/60 | Canada. |
| 1,141,588 | 3/57 | France. |
| 451,367 | 10/27 | Germany. |
| 560,332 | 12/30 | Germany. |

OTHER REFERENCES

O. S. Lieberg: High Temperature Water Systems, The Industrial Press, New York 13, N.Y., 1958.

EDWARD J. MICHAEL, *Primary Examiner.*